United States Patent [19]

Beecher

[11] Patent Number: 4,779,965

[45] Date of Patent: Oct. 25, 1988

[54] ECCENTRIC CLOSE-UP LENS CONVERTING A BINOCULAR INTO A STEREOMICROSCOPE

[76] Inventor: William J. Beecher, Chicago, Ill.

[21] Appl. No.: 583,994

[22] Filed: Feb. 27, 1984

[51] Int. Cl.⁴ .................. G02B 21/22; G02B 21/20; G02B 13/18
[52] U.S. Cl. ................................ 350/432; 350/145; 350/514; 350/515
[58] Field of Search ................... 350/130–132, 350/144, 145, 432–435, 437, 451, 514, 515, 522

[56] References Cited

U.S. PATENT DOCUMENTS

| | | | |
|---|---|---|---|
| 2,258,903 | 10/1941 | Mitchell | 350/144 |
| 2,767,629 | 10/1956 | Millet | 350/130 |
| 3,970,361 | 7/1976 | DiMatteo et al. | 350/144 |
| 4,486,076 | 12/1984 | Taenzar | 350/132 |
| 4,597,634 | 7/1986 | Steenblik | 350/131 X |

FOREIGN PATENT DOCUMENTS

| | | | |
|---|---|---|---|
| 492778 | 4/1954 | Italy | 350/145 |
| 176704 | 1/1966 | U.S.S.R. | 350/145 |

*Primary Examiner*—John K. Corbin
*Assistant Examiner*—Scott J. Sugarman

[57] ABSTRACT

An eccentric or off-center positive achromatic lens for attachment to the objective lenses of a binocular instrument in pairs, to the end that their counter-rotation, toward or away from each other, so moves the separate images formed by the two binocular telescopes as to fuse them into a single, stereoscopic image at approximately reading distance. The lenses are especially adapted to light-weight, high-quality spectacle binoculars, permitting the hands to remain free. They adapt such a binocular to become a stereomicroscope, ideal for highly-detailed dental work, micro-surgery and small-parts assembly. Suitable means is provided, in the form of a pair of grooved, rotatable tubes, containing the pair of asymmetrical lenses, to turn them in unison by means of an elastic belt to effect the stereoscopic fusion.

3 Claims, 1 Drawing Sheet

ECCENTRIC CLOSE-UP LENS CONVERTING A BINOCULAR INTO A STEREOMICROSCOPE

BACKGROUND OF THE INVENTION

Binoculars have been in use for a very long time. Even high-powered prism binoculars, magnifying from six to ten times, have been in use for over 140 years, ever since the Italian, Porro, invented the right angle prism, a pair of which could mirror the upside-down image of the objective the 4 times required to turn it right-side-up and correct it right to left. But such binoculars were for distance viewing only and a modern prism binocular customarily has a focus range from about ten feet to infinity.

FIELD OF THE INVENTION

Binocular microscopes or stereomicroscopes are a more recent invention. Such a binocular microscope cannot focus on infinity at all. Instead, the two telescopes, each with an objective lens at the far end of the tube and an eyepiece at the viewing end, are designed to converge rather than remain rigidly parallel. The optics of a stereomicroscope are designed from the drawing board to provide to the viewer's two eyes a stereo image of a small object at about 8 inches distance, in magnifications in the range of 5 times to 50 times. A pair of Porro prisms or other prisms form part of the optical system in each converging tube. Until now no inventer has attempted to combine the distance binocular with the close-up binocular microscope. That is the goal of this invention.

SUMMARY OF THE INVENTION

The present invention converts the distance binocular into a close-up binocular or stereomicroscope by adding positive or plus lenses in front of the binocular objective lenses. It is well-known that such a positive lens of 8 or 10 inch focal length will cause the distance binocular to focus on small objects 8 to 14 inches away from the eyes. However, there is the problem of parallax in the distance binocular, in which the two telescopes are rigidly hinged together so that they remain parallel. The small, close-up object may not be seen by both at the same time and no stereo image is possible. The two separate images are converged stereoscopically in the present invention by using asymmetrical paired achromats of approximately 8 to 10 inches focal length. This close-up asymmetrical lens must be an achromat; a simple positive lens element would produce serious chromatic aberration. The best method of obtaining a pair of asymmetrical achromats is to core them out of the edges of an achromat of the correct focal length that is slightly larger in diameter than the combined diameters of the needed pair. This guarantees their asymmetry which has a "wedge effect" or power to displace a viewed object. It is this attribute that is used to converge the separate images.

DESCRIPTION OF THE PREFERRED EMBODIMENT

The effectiveness of the invention is based on the ability of the asymetrical lens to displace an image off the optical axis of the distance binocular with its two rigidly parallel telescopes. It will be found that, when a pair of such asymmetrical lenses is movably and rotatably mounted to the objective barrels of such a binocular with the thicker sides adjacent to each other as in FIG. 1, a correction of the binocular's parallax occurs at the same time that the focal length is shortened. If one thinks of an imaginary line, running from the thick side of the lens to the thin side and passing through the center, this is the axis of the asymmetry. Counter-rotating the pair of lenses toward and away from each other in unison, changes the two axes such that—at a point which varies with the interpupillary distance of the viewer and his inherent visual power in diopters, the wedge effect of the asymmetrical lenses will fuse the images of the twin telescopes of the binocular stereoscopically at a distance of 8 to 14 inches from the eyes. The focus of the stereomicroscope thus created is fixed. The user moves the viewed object to the binocular or the binocular, worn as a spectacle, to the object until sharp focus is achieved.

Figure 1A:
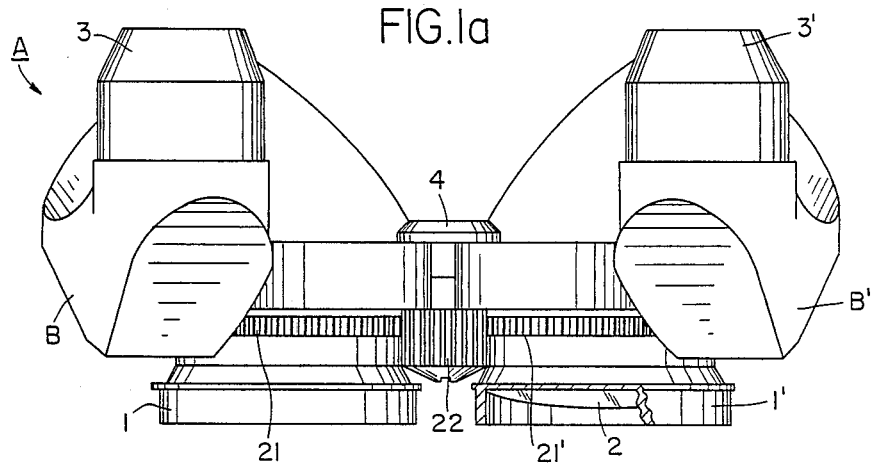
FIG. 1a is a drawing of the prior art Beecher spectacle binocular of U.S. Pat. No. 3,985,421 in an underside view as it would be seen by a user about to bring it to his eyes for viewing with the right objective barrel cut away to show a partial cross-sectional view of the right objective lens.
Figure 1B:
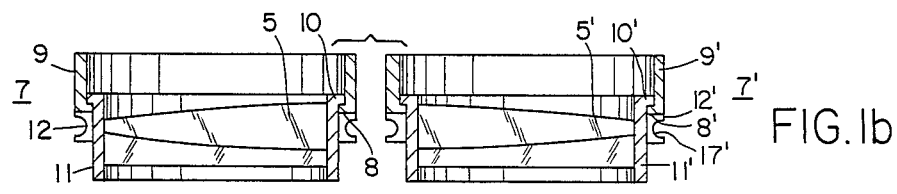
FIG. 1b shows the pair of asymmetrical lenses in their cells in cross section.
Figure 1C:
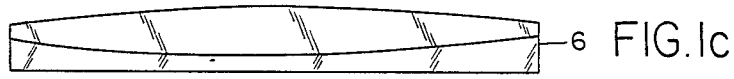
FIG. 1c shows a cross-sectional view of a larger achromat from which the paired, asymmetrical achromats have been cored out.

To see how the invention works in this preferred embodiment, I now refer to FIG. 1 in detail. The Beecher mirror binocular A comprises a left telescope B and a right telescope B', each telescope having an objective lens barrel 1 and 1', containing a positive achromatic lens, as well as an eyepiece barrel, 3 and 3', with a plurality of lenses. Four internal mirrors, suitably arranged between objective and eyepiece lenses (but not shown) transmit a completely corrected image of a distant object to the eye of the user. With both telescopes combined by virtue of the central hinge 4 into a binocular, the image is also fully collimated, which is to say that the axes of the telescopes are parallel. FIG. 1 shows the right barrel partially cut away to reveal a single objective lens element 2. The figure depicts a view of the underside of the binocular as it would be held in the hands before bringing it up to the eyes for viewing. At the objective end of the binocular is drawn in cross section the pair of mounted asymmetrical positive achromat lenses 5 and 5' which have been cored from the edges of the much larger achromatic lens 6, shown in cross section below.

These asymmetrical achromats become, in effect, achromatic wedges or thin prisms, but having magnifying power as well as the ability to displace the viewed image. A tubular mount or cell 7 and 7' is provided for each close-up lens, permitting it to be attached securely over the front of the objective lens barrel 1 and 1' of each telescope of the binocular. Each mount consists of an internally collared or flanged 8 and 8' fixed portion 9 and 9', which is tightly fitted over the outer surface of the binocular objective barrel 1 and 1' and an externally-collared or flanged 10 and 10' rotatable portion 11 and 11'. In practice, before the fixed portion 9 and 9' is placed on the objective barrel 1 and 1', the rotatable portion 11 and 11' is inserted through it so that the external collar 10 and 10' engages the internal collar 8 and 8'. The two collars and their respective tube portions are held in rotatable apposition by the grooved portion 12 and 12', snugged against the internal collar 8 and 8' of the fixed portion 9 and 9' and permanently cemented to portions 11 and 11' after the application of a little silicone grease between the aposed collars.

The asymmetrical achromat 5 and 5' is cemented into the rotatable portion 12 and 12' of the lens mount 7 with the flat side forward or, in other words, at the end of the barrel opposite that having the aforesaid external collar. It is cemented at least ⅛ inches from the end of this rotatable portion so that the extreme end of this tube becomes a lens shade.

Figure 2:
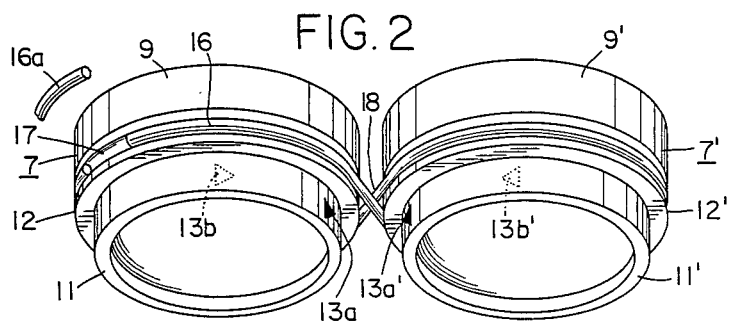
FIG. 2 is a drawing of an oblique view of the asymmetrical lens pair in a pair of cells, as the cells would fit tightly over the objective barrels of the binocular in FIG. 1. It shows the grooves in the rotatable portions of the cells containing the lenses and the elastic belt fitted tightly into the grooves of the two lens cells in a figure-eight conformation. A short section of the elastic belt is removed from the left cell to show the groove, which is also visible in cross-section in FIG. 1

FIG. 2 shows the two accessory lens mounts 7 and 7' assembled as described above, with the fixed portions 9 and 9' and the rotatable portions 11 and 11' permanently engaged by means of the aforesaid collars 8 and 8' and 10 and 10', and prevented from coming apart by the cemented grooved portions 12 and 12', as seen diagrammatically in FIG. 1. It is now possible to fit these assembled mounts 7 and 7' tightly over the objective barrels 1 and 1' of the binocular A. The rotatable portions 11 and 11' of the lens mounts 7 and 7' are marked with location spots 13 and 13' which designate the thickest sides of the asymmetrical lenses. The rotatable tubes 11 and 11', and their lenses, are now turned until both thick sides are facing each other at the point 13a and 13a' where they are closest together. In this position the narrowest sides of the lenses are directly opposite the thickest sides and on the outer edge of the rotatable tubes 11 and 11', and the axis of the asymmetry is at its maximum. That is, the prismatic or wedge effect of the asymmetrical lenses and their ability to bend the two separate images and fuse them stereoscopically is at its highest degree. This is the approximate position of the asymmetrical lenses for users with wide interpupillary distances when they set the binocular on its hinge for correct viewing—interpupillary distances of 70 mm or more. For users with narrow interpupillary distances—60 mm or less—the correct positions of the asymmetrical lenses might be with the thick edges at the point 13b and 13b'.

It is clear that these asymmetrical achromatic lenses have the same power to bend light that a prism or optical wedge has, thus overcoming the parallax problem created by the fact that, were centered and symmetrical achromats placed before the binocular objectives, two separate images would result. The advantage of this invention is that, at the same time the asymmetrical paired lenses are shortening the focal length of the binocular instrument to permit viewing objects a foot away, they also merge the two separate images stereoscopically into one. Of course the asymmetrical lenses need not be cored out of a larger achromat. They may be designed and ground asymmetrically.

In practice the user will wear the binocular on its spectacle frame and will bring the now fixed-focus instrument down to the viewed object until it is in focus. His hands must be free to turn the rotatable tubes 11 and 11' toward and away from each other in unison until the two separate images are fused stereoscopically into one, regardless of the varying interpupillary distance and inherent eye power of different users. After that his hands are free to manipulate the viewed object.

However, it is desirable further to co-ordinate the counter-rotation of the aforesaid tubes. This is accomplished simply by placing a tightly-fitted elastic belt 16 into the grooves 17 and 17' of the grooved portion 12 and 12' in a figure eight conformation 18. In this arrangement, when the user turns the right rotatable tube 11' clockwise, the left tube 11 will turn counterclockwise. Should he find that the stereoscopic image is fusing lopsidedly, he may hold one tube while rotating the other slightly. The belt will slip in its groove until his visual inspection finds the fusion to be balanced. A section of the belt is removed at 16a, showing groove 17.

Figures 3A, 3B:
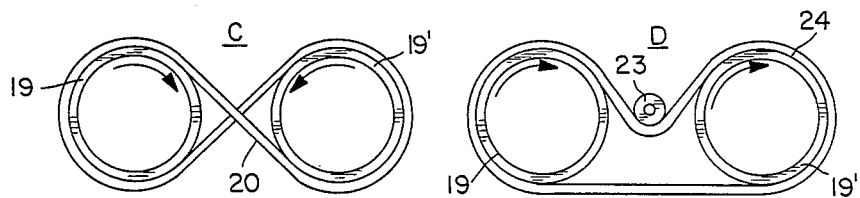
FIG. 3a and FIG. 3b illustrate in two schematic, cross-sectional drawings on a reduced scale that the figure-eight conformation of the elastic belt turns the grooved tubes toward and away from each other cooperatively, while a conformation in which the belt makes a half-loop around a central hub turns the grooved tubes in the same direction.

In FIG. 3 under C the figure eight conformation of the belt 20 is shown diagrammatically in reduced scale. It may be seen that the diagrammatic barrels 19 and 19' will rotate counter to each other as shown by the arrows. Of course a similar belt could replace the focusing gears 21, 21' and 22 in my binocular U.S. Pat. No. 3,985,421 and U.S. application Ser. No. 344,062 now U.S. Pat. No. 4,488,790 (FIG. 1). To focus the left objective in this case, one would simply turn its barrel while holding the right barrel and allowing the belt to slip in its groove. However, the problem of focusing a binocular requires that both barrels turn simultaneously in the *same* direction, not in opposite directions (FIG. 3D). This is accomplished by looping the belt 24 halfway around the hingepost 23, after removing the idler gear 22. In this arrangement the objectives turn in the same direction as indicated by the arrows.

Having thus described the invention, what I claim as new and desire to secure by Letters Patent is:

1. A stereoscopic system having an eccentric, off-center positive achromatic lens for attachment to the objective lenses of a binocular viewing instrument in pairs, such that their counter-rotation, toward or away from each other, moves the separate images formed by the two binocular telescopes in order to fuse them into a single, stereoscopic image at approximately reading distance, and wherein said pairs of lenses are cored from the edges of a symmetrical or centered achromatic lens of substantially more than twice the diameter of one of the paired lenses.

2. A stereoscopic system having an eccentric, off-center, positive achromatic lens as in claim 1, further including a two-part tubular cell or mount for rotatably attaching each asymmetrical lens to the objective barrel of a binocular in pairs.

3. A stereoscopic system having an eccentric, off-center positive achromatic lens as in claim 2 wherein there is a fixed portion for attaching the mount to the objective barrel of a binocular and a rotatable portion containing the asymmetrical lens, such that the paired asymmetrical lenses may be rotated on their axes to achieve fusion of the separate images stereoscopically by overcoming the parallax.

* * * * *